United States Patent
Higashiyama et al.

(10) Patent No.: US 8,078,232 B2
(45) Date of Patent: Dec. 13, 2011

(54) PORTABLE TERMINAL DEVICE

(75) Inventors: Tadashi Higashiyama, Daito (JP);
Masaki Nakao, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/001,021

(22) PCT Filed: Jun. 15, 2009

(86) PCT No.: PCT/JP2009/060884
§ 371 (c)(1),
(2), (4) Date: Dec. 22, 2010

(87) PCT Pub. No.: WO2009/157336
PCT Pub. Date: Dec. 30, 2009

(65) Prior Publication Data
US 2011/0124377 A1    May 26, 2011

(30) Foreign Application Priority Data
Jun. 26, 2008    (JP) .................................. 2008-167993

(51) Int. Cl.
*H04M 1/00*    (2006.01)
(52) U.S. Cl. .................. 455/566; 455/575.4; 455/575.1; 455/550.1; 455/90.3; 345/169; 345/173; 345/174; 345/175; 345/176
(58) Field of Classification Search ............... 455/550.1, 455/566, 575.1, 575.4, 90.3; 345/169, 173, 345/174, 175, 176
See application file for complete search history.

(56) References Cited

U.S. PATENT DOCUMENTS

| | | | |
|---|---|---|---|
| 5,450,619 A * | 9/1995 | Maeda | 455/566 |
| 6,573,886 B1 * | 6/2003 | Lehtinen et al. | 345/173 |
| 6,748,249 B1 * | 6/2004 | Eromaki et al. | 455/575.4 |
| 2004/0198437 A1 * | 10/2004 | Yamamoto et al. | 455/556.1 |
| 2004/0235540 A1 | 11/2004 | Yajima | |
| 2007/0126705 A1 | 6/2007 | Ko et al. | |

(Continued)

FOREIGN PATENT DOCUMENTS

JP    2000-201208 A    7/2000

(Continued)

OTHER PUBLICATIONS

International Search Report and Written Opinion dated Sep. 15, 2009 issued by the Japanese Patent Office for International Application No. PCT/JP2009/060884.

*Primary Examiner* — Olumide T Ajibade Akonai
(74) *Attorney, Agent, or Firm* — Procopio, Cory, Hargreaves & Savitch LLP

(57) ABSTRACT

A mobile phone of the present invention includes a first cabinet; a second cabinet that is slidable along an upper surface of the first cabinet; a first touch sensor that enables input by touching the upper surface; a projection that projects from the second cabinet toward the upper surface; a second touch sensor that detects a position of contact of the projection with the upper surface; and a CPU that controls input by the first touch sensor in accordance with output from the second touch sensor. The CPU enables input by the first touch sensor when the second cabinet is in a first position (OP position) where the second case exposes a detection area of the first touch sensor to the outside, and disables input by the first touch sensor when the second cabinet is out of the first position (OP position).

6 Claims, 10 Drawing Sheets

U.S. PATENT DOCUMENTS

| | | | |
|---|---|---|---|
| 2008/0207272 A1* | 8/2008 | Thornton et al. | 455/566 |
| 2008/0261666 A1* | 10/2008 | Niitsu et al. | 455/575.4 |
| 2008/0287169 A1* | 11/2008 | Kim et al. | 455/575.4 |
| 2009/0048001 A1* | 2/2009 | Mihara et al. | 455/566 |

FOREIGN PATENT DOCUMENTS

| | | |
|---|---|---|
| JP | 2003-298699 A | 10/2003 |
| JP | 2004-072285 A | 3/2004 |
| JP | 2004-153454 A | 5/2004 |
| JP | 2005-109970 A | 4/2005 |
| JP | 2006-148262 A | 6/2006 |
| JP | 2007-028417 A | 2/2007 |
| JP | 2007-066169 A | 3/2007 |
| JP | 2007-157157 A | 6/2007 |
| JP | 2007-243961 A | 9/2007 |
| JP | 2008-092081 A | 4/2008 |

* cited by examiner

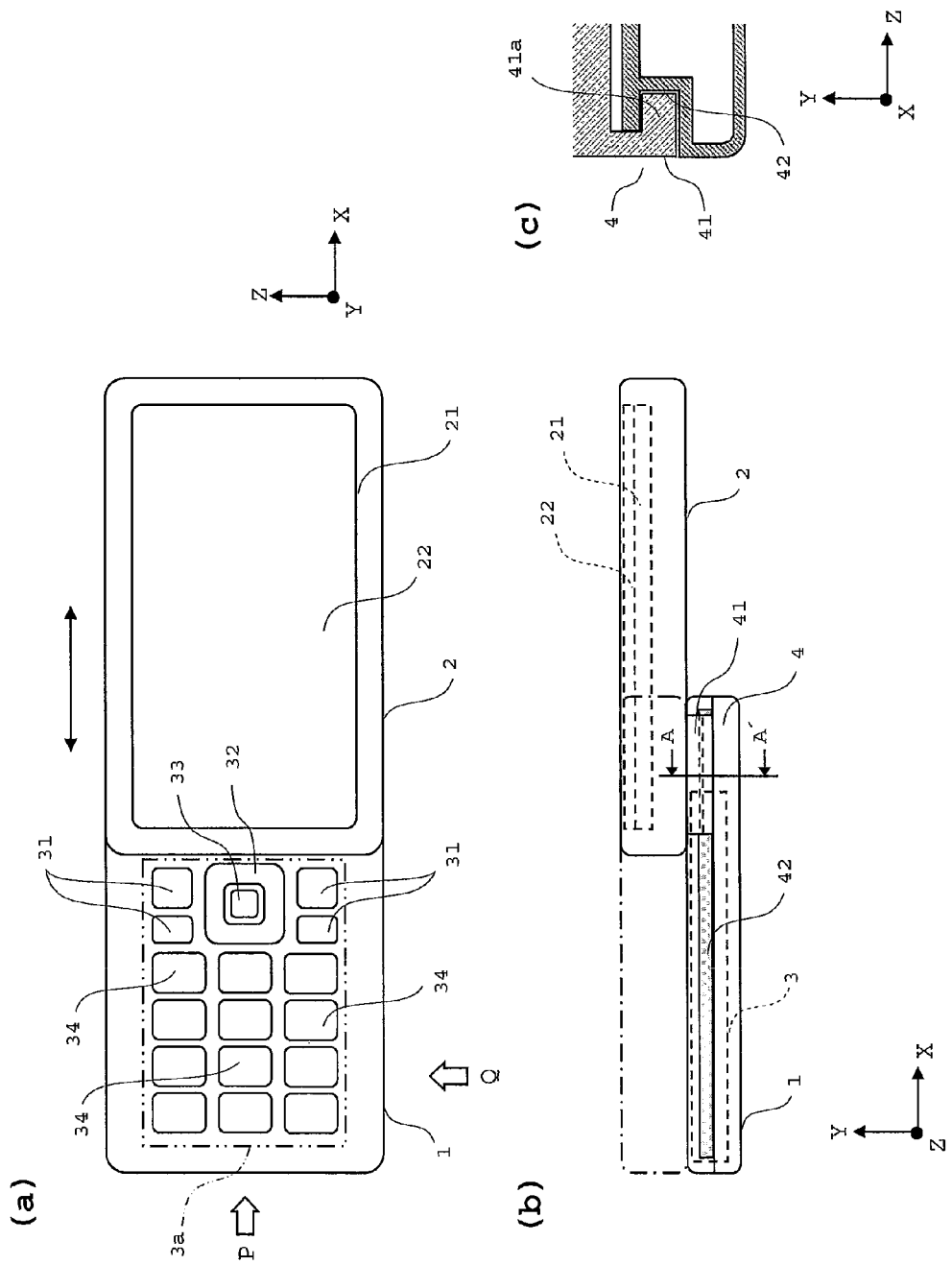
[FIG. 1]

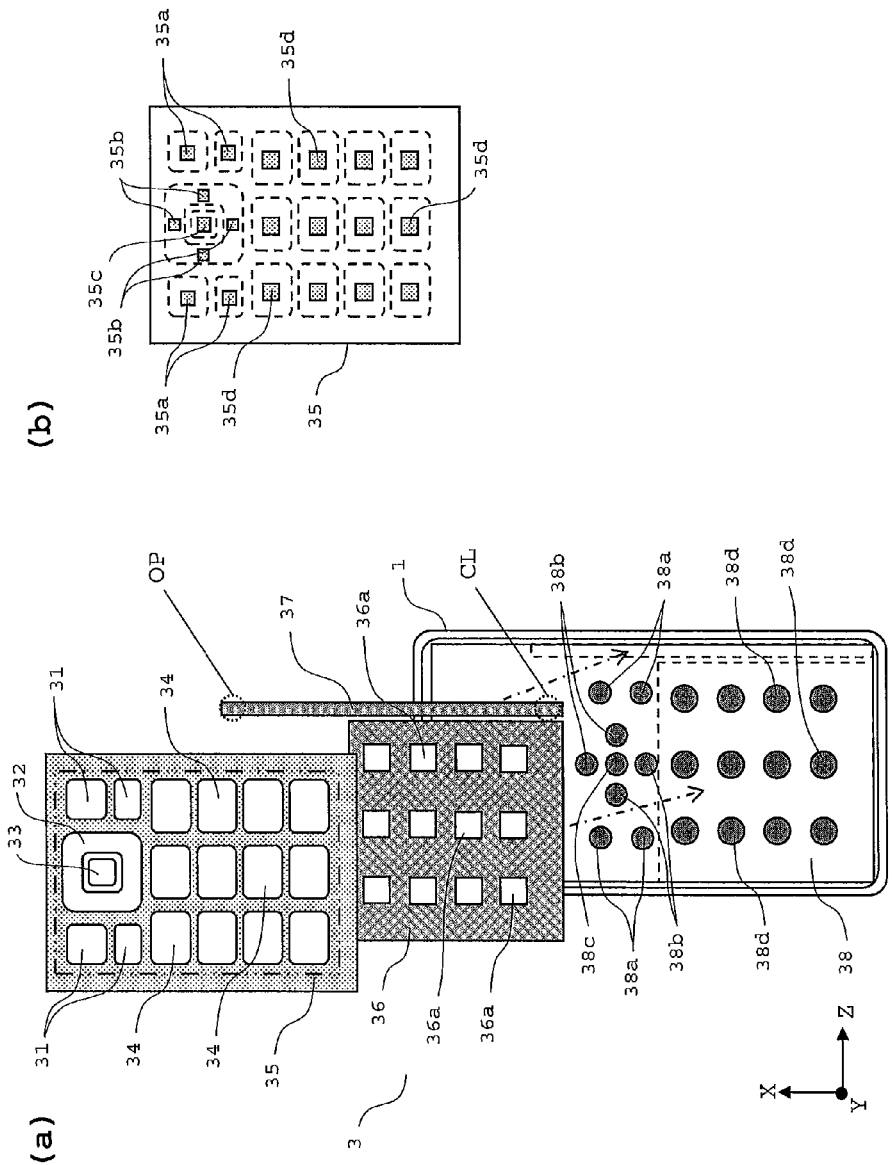
[FIG. 2]

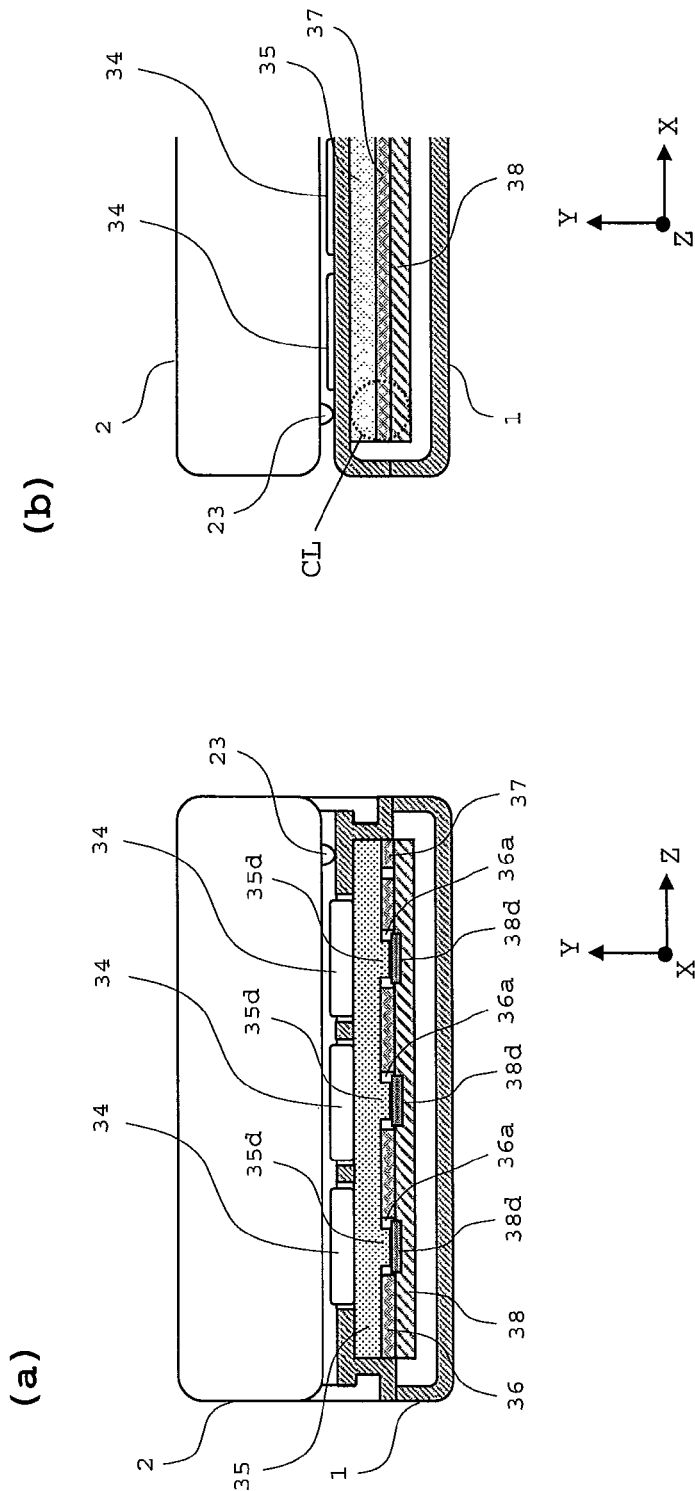
[FIG. 3]

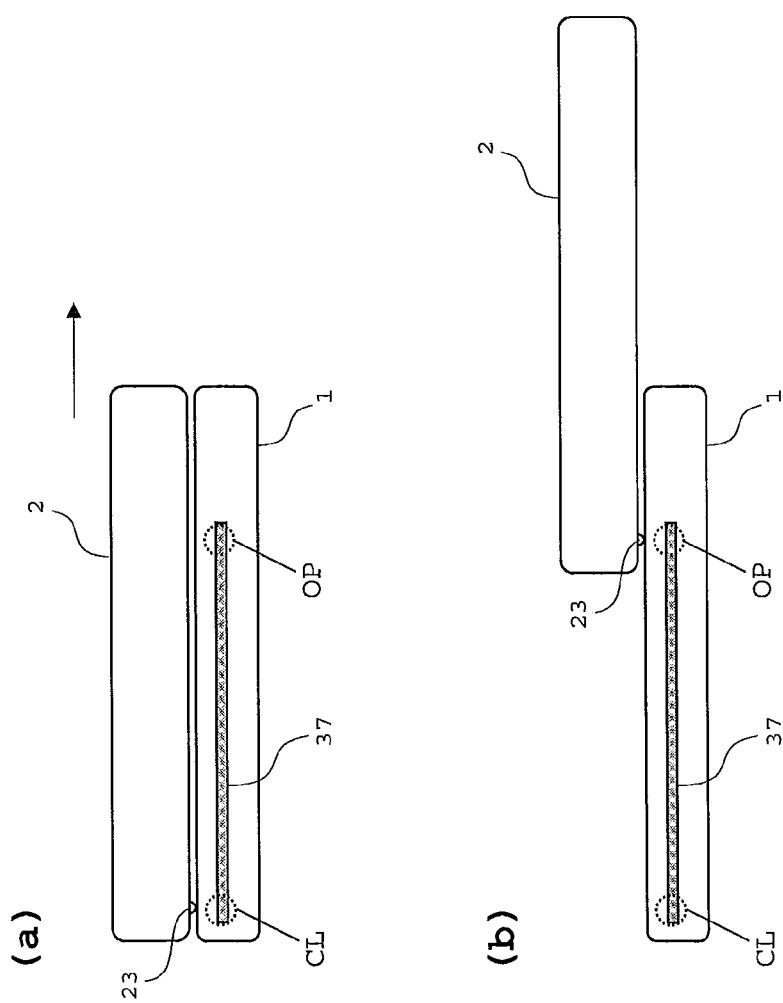
[FIG. 4]

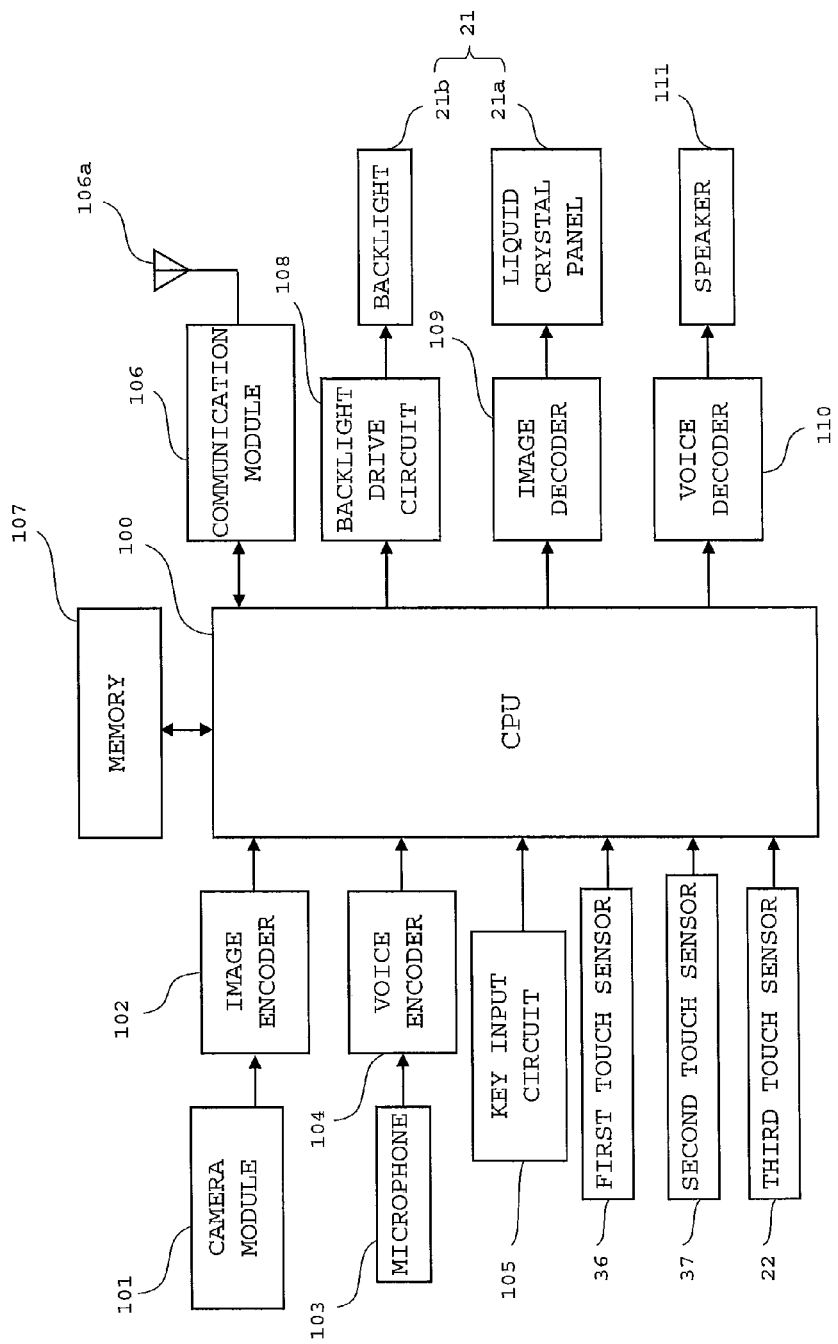
[FIG. 5]

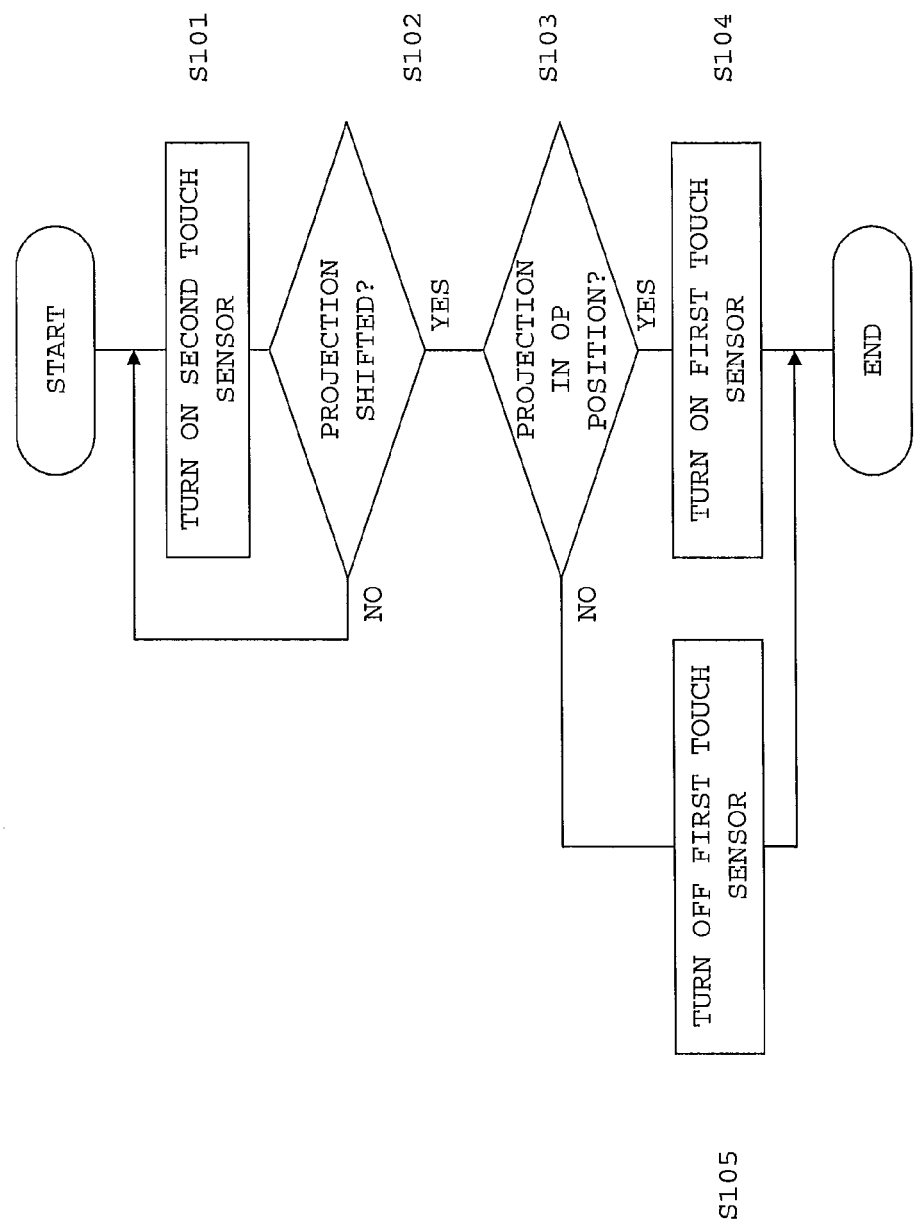
[FIG. 6]

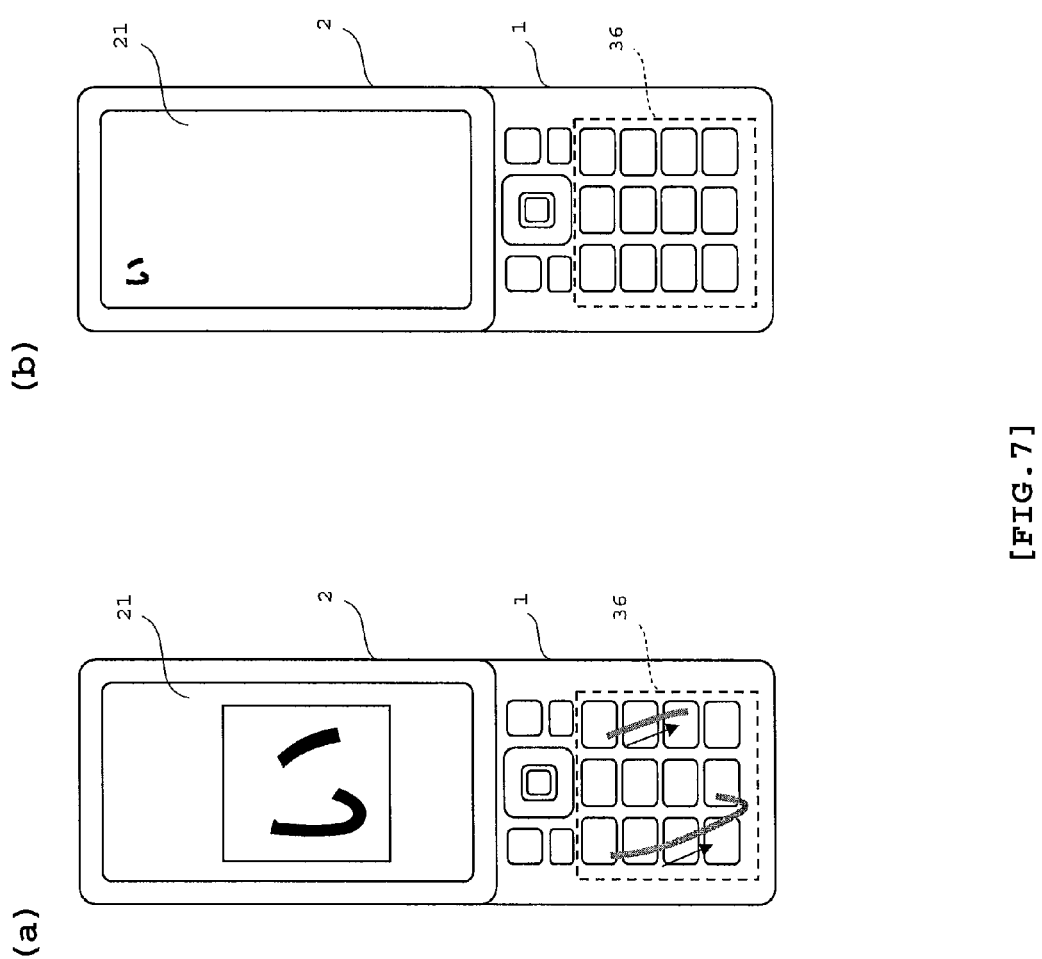
[FIG. 7]

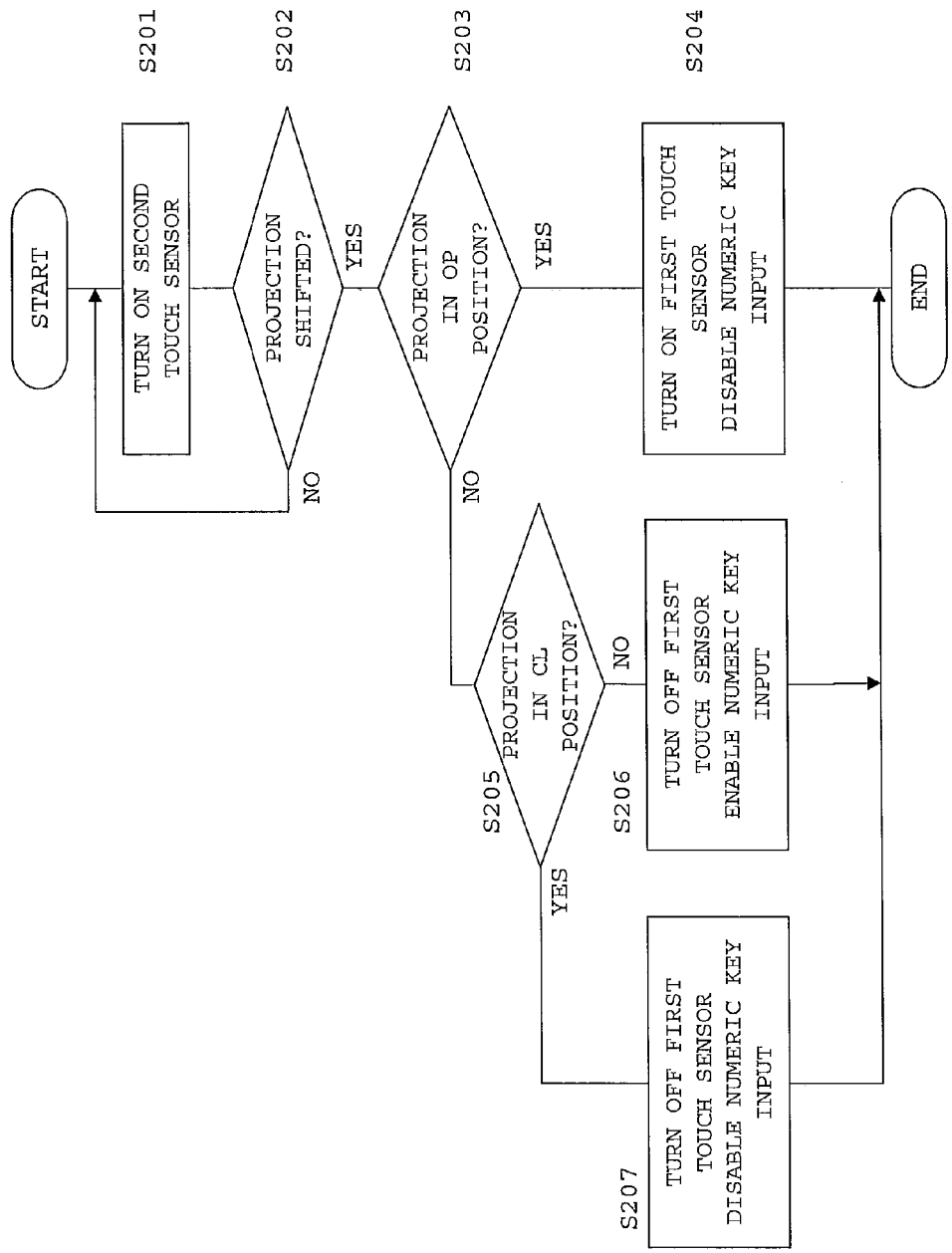
[FIG. 8]

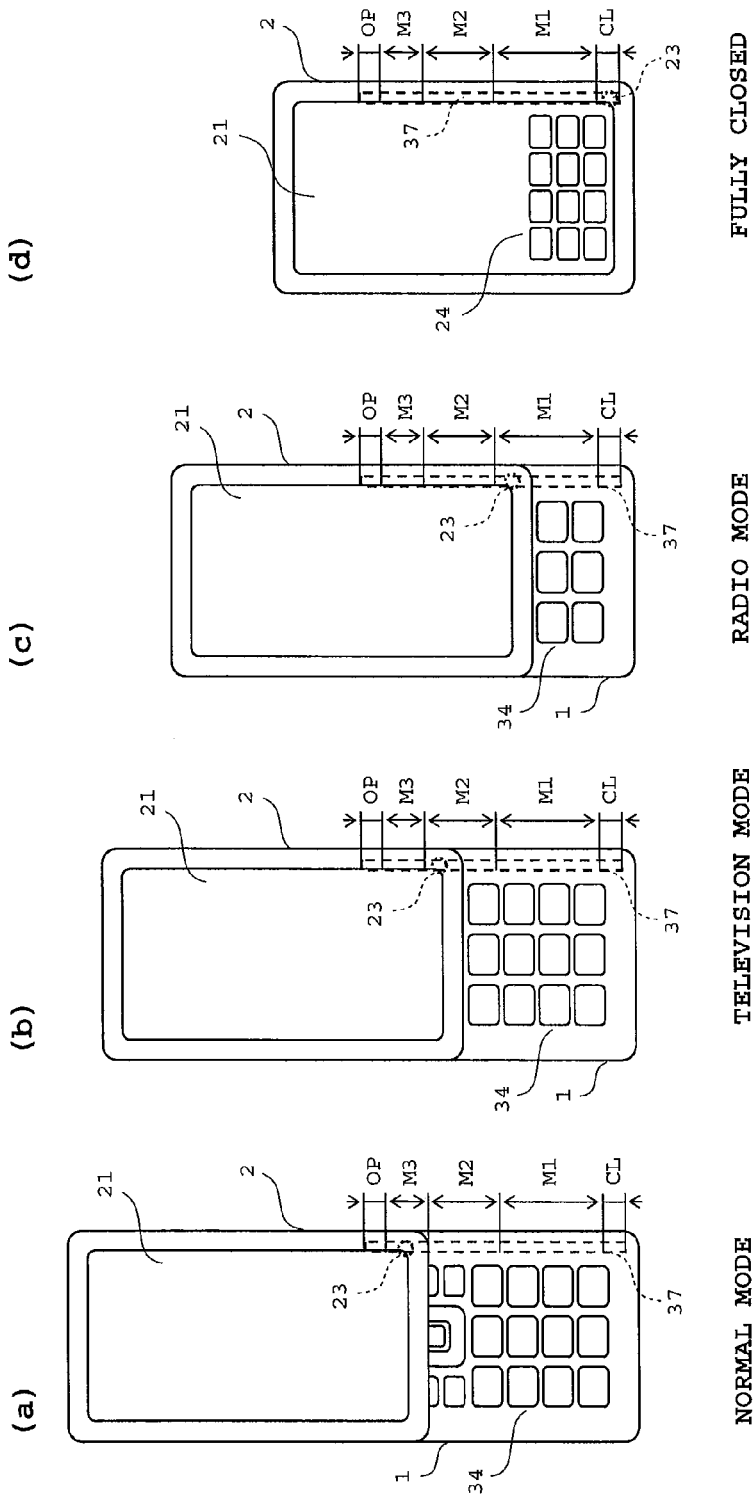
[FIG.9]

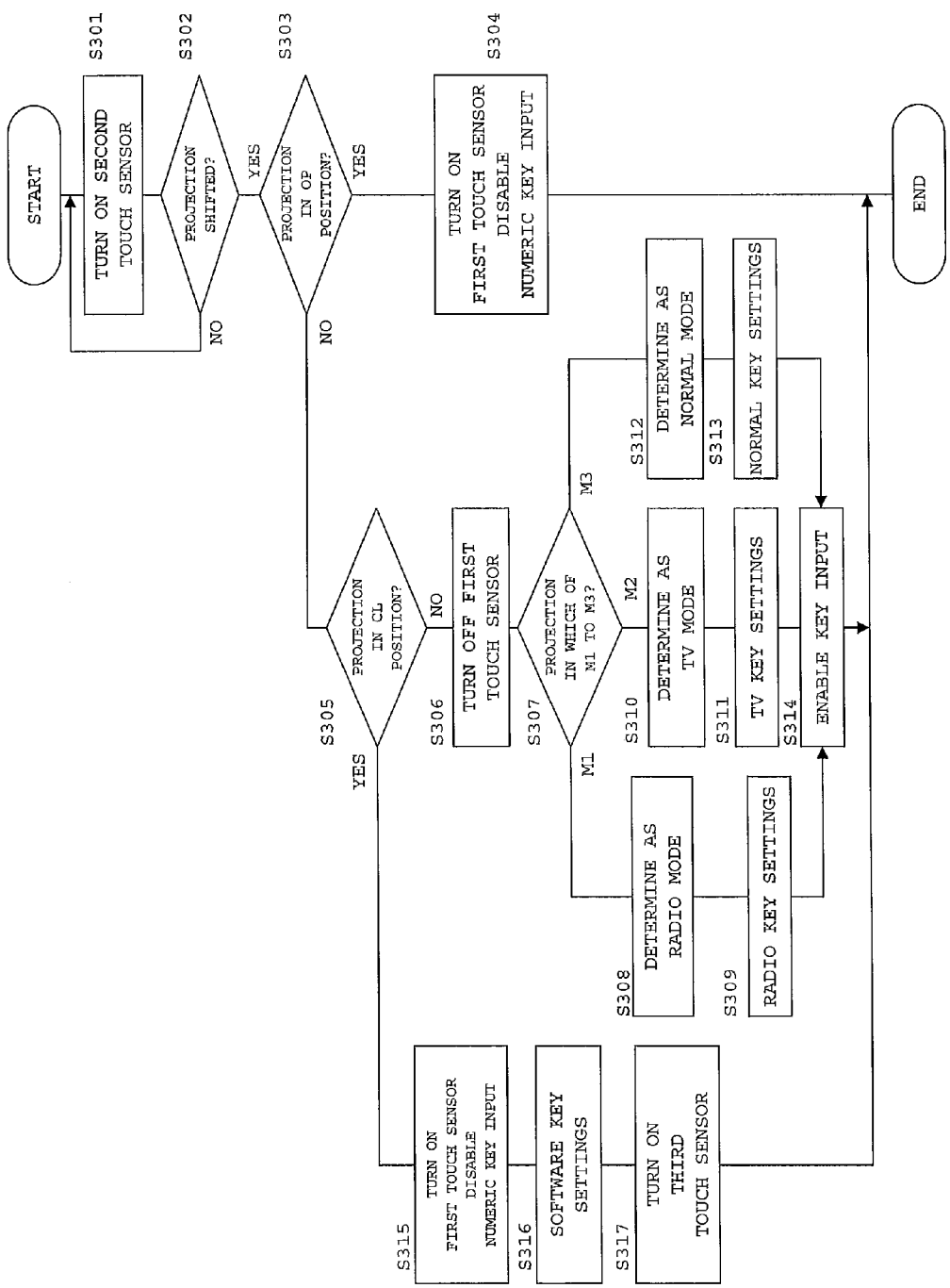
[FIG.10]

PORTABLE TERMINAL DEVICE

TECHNICAL FIELD

The present invention relates to portable terminal devices such as mobile phones and personal digital assistants (PDAs).

BACKGROUND ART

As an example of a related art, slide-open mobile phones are well known. JP 2007-28417A published on Feb. 1, 2007, discloses one example of such a related art. The slide-open mobile phone has a first case with a plurality of operation buttons and a second case with a monitor screen that is slidably arranged on an upper surface of the first cabinet. When the two cases are overlapped (closed), the second case is slid to thereby expose the operation buttons on the first case to the outside.

Meanwhile, as another example of a related art, in recent years there has been developed a mobile phone that has a touch sensor (contact sensor) in a layout area of operation buttons. This device recognizes characters or the like handwritten within a detection area of the touch sensor on the basis of position information from the touch sensor, thereby enabling not only input by the operation buttons but also handwriting input. JP 2007-66169A published on Mar. 15, 2007, discloses one example of the related art. Enabling handwriting input in this manner further improves user friendliness.

This handwriting input function can also be applied to the foregoing slide-open mobile phones.

DISCLOSURE OF THE INVENTION

Problem to be Solved by the Invention

On a slide mobile phone, if a first case is equipped with a touch sensor, the touch sensor is generally made active when it is detected that a second case is opened.

Detection of opening and closing is carried out by a magnet and a MR sensor (a magnetoresistance sensor), for example. Specifically, one of the two cases has the magnet and the other has the MR sensor, so that the magnet and the MR sensor come closer to each other when the two cases are closed. In this case, when the second case starts to slide in a state where the two cases are closed, it is detected that the cases are opened and the touch sensor is made active.

When being opened, the second case slides with a back surface closer to a detection plane of the touch sensor. At that time, if the back surface of the case has slight distortion or the like due to manufacturing error or the like, the back surface of the case may partially touch the detection plane of the touch sensor during the sliding.

Accordingly, if the touch sensor is activated during sliding of the case, the back surface of the case may partially touch the detection plane of the touch sensor to make incorrect input by the touch sensor.

The present invention is devised to solve this problem, and an object of the present invention is to provide a portable terminal device that prevents incorrect input by the touch sensor from taking place during sliding and opening of the case.

Means to Solve the Problem

A portable terminal device of the present invention includes: a first case; a second case that is slidable along one surface of the first case; a first touch sensor that accepts input to the surface; a projecting section that projects from the second case toward the surface; a detecting section that detects a position of the projecting section; and a control section that controls input by the first touch sensor on the basis of output from the detecting section. In this arrangement, the control section enables input by the first touch sensor when the second case is in a first position where the second case exposes a detection area of the first touch sensor to the outside, and disables input by the first touch sensor when the second case is out of the first position.

For example, the projecting section may be configured to shift in contact with the surface together with sliding of the second case, and the detecting section may be configured to detect a position of contact of the projecting section with the surface. In addition, the detecting section may be configured to have a second touch sensor that accepts input to the surface, for example.

According to the foregoing configuration, input by the first touch sensor is enabled when the second case is in the first position as to expose the detection area of the first touch sensor to the outside, and input by the first touch sensor is disabled when the second case is out of the first position. Accordingly, input by the first touch sensor is disabled while the second case slides over the detection area of the first touch sensor. Therefore, it is possible to prevent incorrect input even if the second case partially touches the detection area of the first touch sensor by accident.

Further, in the portable terminal device of the present invention, the surface may have a plurality of operation buttons. In this case, the control section may be configured to enable input by the operation buttons when the second case is out of the first position.

In such a configuration, it is possible to allow a user to perform an input operation with use of the operation buttons when the second case is out of the first position and input by the first touch sensor is disabled. This improves user friendliness.

Further, in the portable terminal device of the present invention, the detecting section may be configured to detect that the second case is out of the first position and is in a second position where the second case covers some of the plurality of operation buttons. In this case, the control section may be configured to, when the second case is in the second position, set the operation buttons with functions corresponding to the second position.

In such a configuration, when some of the operation buttons are covered, a user can perform an input operation smoothly using the externally exposed operation buttons.

Further, in the portable terminal device of the present invention, the second case may have a display section that outputs an image from one surface of the second case and an input section through which the image can be penetrated. In this arrangement, the detecting section may be configured to detect that the second case is in a third position where the second case is most distant from the first position. In addition, the control section may be configured to enable input by the input section when the second case is in the third position.

In such a configuration, even if the second case is closed and hence input by the first touch sensor and the operation buttons cannot be sufficiently performed, a user perform an input operation by the input section, thereby further improving user friendliness.

As described above, according to the present invention, it is possible to prevent that incorrect input by the first touch sensor on the first case takes place when the second case is slid and opened.

The foregoing and other advantages and significances of the present invention will be more fully understood from the following description of a preferred embodiment. The following embodiment is merely one example of an embodiment of the present invention, and the present invention is not limited to by the following embodiment.

BRIEF DESCRIPTION OF THE DRAWINGS

FIG. 1 is a diagram showing an external configuration of a mobile phone in an embodiment of the present invention;

FIG. 2 is a diagram showing a configuration of a key input section in the embodiment;

FIG. 3 is a diagram showing the assembled key input section in the embodiment;

FIG. 4 is a diagram for describing a positional relation between a projection on a second cabinet and a second touch sensor when the second cabinet is opened and closed in the embodiment;

FIG. 5 is a block diagram showing an entire configuration of the mobile phone in the embodiment;

FIG. 6 is a flowchart of an input setting process in accordance with opening and closing of the second cabinet in the embodiment;

FIG. 7 is a diagram showing one example of a handwriting input operation with the second cabinet fully opened in the embodiment;

FIG. 8 is a flowchart of an input setting process in accordance with opening and closing of the second cabinet in a modification example 1;

FIG. 9 is a diagram for describing usage modes of the mobile phone in a modification example 2; and FIG. 10 is a flowchart showing an input setting process in accordance with opening and closing of the second cabinet in the modification example 2.

However, the drawings are only for the purpose of description, and do not limit the scope of the present invention.

BEST MODE FOR CARRYING OUT THE INVENTION

An embodiment of the present invention will be described below with reference to the drawings.

In this embodiment, a first cabinet 1 and a second cabinet 2 are equivalent to a "first case" and a "second case" recited in the claims, respectively; a liquid crystal display 21 is equivalent to a "display section" recited in the claims; a third touch sensor 22 is equivalent to an "input section" recited in the claims; a projection 23 is equivalent to a "projecting section" recited in the claims; numeric keys 34 are equivalent to "operation buttons" recited in the claims; a first touch sensor 36 is equivalent to a "first touch sensor" recited in the claims; a second touch sensor 37 is equivalent to a "detecting section" and a "second touch sensor" recited in the claims; a "control section" recited in the claims is implemented as a function imparted to a CPU 100 by a control program stored in a memory 107. However, the foregoing correspondences between the claims and this embodiment are shown as merely examples, and the claims are not limited by this embodiment.

FIG. 1 is a diagram showing an external configuration of a mobile phone: FIG. 1(a) is a front view of the mobile phone with a second cabinet opened; FIG. 1(b) is a side view of the mobile phone in the same state; and FIG. 1(c) is a cross-section view of FIG. 1(b) taken along A-A'.

The mobile phone includes the first cabinet 1 and the second cabinet 2. The first cabinet 1 has a key input and opening/closing detecting section 3 (hereinafter, referred to as simply "key input section"). The key input section 3 detects various input operations to the device, and detects an opening/closing state of the second cabinet 2 with respect to the first cabinet 1.

The first cabinet 1 has on an upper surface thereof an operation key group 3a constituting the key input section 3. The operation key group 3a are composed of four main keys 31, a direction key 32, a confirmation key 33, and twelve numeric keys 34.

The main keys 31 are used to switch among various function modes (camera shooting mode, mail send/receive mode, Internet mode, and the like), and start and terminate telephone communications. The direction key 32 is operated to select a desired option from various menus on a display screen. The confirmation key 33 is used to confirm a selection from the menu and the like. The numeric keys 34 are used to input characters, alphabets, numbers, and the like.

The second cabinet 2 includes the liquid crystal display 21. The liquid crystal display 21 has on a display screen side thereof the third touch sensor 22. The third touch sensor 22 is a transparent sheet through which the display screen of the liquid crystal display 21 can be seen.

The third touch sensor 22 includes first transparent electrodes and second transparent electrodes arranged in a matrix. The third touch sensor 22 detects changes in capacitance among these transparent electrodes, thereby to determine a position touched by a user on the display screen and output a position signal in accordance with the detected position.

The second cabinet 2 is connected to the first cabinet 1 by a slide mechanism section 4 in such a manner as to be slidable in a direction of an X axis shown in FIG. 1. As shown in FIG. 1(c), the slide mechanism section 4 is constituted by guide plates 41 and guide grooves 42. The guide plates 41 are arranged on a back surface of the second cabinet 2 at right and left ends, and have projecting streaks 41a at lower ends thereof. The guide grooves 42 are formed on side surfaces of the first cabinet 1 along a direction of sliding (X-axis direction of FIG. 1). The projecting streaks 41a of the guide plates 41 engage with the guide grooves 42. When the first cabinet 1 and the second cabinet 2 are connected, there is a slight clearance between the upper surface of the first cabinet 1 and the back surface of the second cabinet 2.

When the mobile phone is closed, the second cabinet 2 lies almost completely over the first cabinet 1, as shown by a dashed line in FIG. 1(b). In this state (closed state), all the keys of the operation key group 3a are hidden behind the second cabinet 2. The second cabinet 2 can slide (open) until the guide plates 41 reaches ends of the guide grooves 42. When the second cabinet 2 is fully opened, all the keys of the operation key group 3a are externally exposed as shown in FIG. 1(a).

FIG. 2 is a diagram showing a configuration of the key input section: FIG. 2(a) is a front view of the disassembled first cabinet (the upper part of the cabinet is omitted); and FIG. 2(b) is a rear view of a keypad.

The key input section 3 includes the operation key group 3a (the main keys 31, the direction key 32, the confirmation key 33, and the numeric keys 34), a keypad 35, a first touch sensor 36, a second touch sensor 37, and a circuit board 38.

The operation key group 3a is fixed to an upper surface of the keypad 35 with an adhesive or the like. The keypad 35 is made of elastic material. The keypad 35 has on a back surface thereof four pressing sections 35a corresponding to the main keys 31, four pressing sections 35b corresponding to the direction key 32, a pressing section 35c corresponding to the confirmation key 33, twelve pressing section 35d corresponding to the numeric keys 34, which project backward (toward the circuit board 38) shown in FIG. 2(b).

The first touch sensor 36 is formed in the shape of a sheet, and is sized in correspondence with a layout area of the numeric keys 34. The first touch sensor 36 has twelve key holes 36a into which the pressing sections 35d on the back surface of the keypad 35 are inserted.

The first touch sensor 36 includes first electrodes and second electrodes arranged in a matrix, and detects changes in capacitance among these electrodes to thereby determine a position touched by a user within the detection area, and outputs a position signal in accordance with the detected position.

The second touch sensor 37 is formed in the shape of a sheet elongated in a direction of an X axis shown in FIG. 2. The X-axis length of the second touch sensor 37 corresponds to a slide stroke of the second cabinet 2.

The second touch sensor 37 is the same in structure as the first touch sensor 36. The second touch sensor 37 detects a position touched by a projection of the second cabinet 2 (described later) within the detection area, and outputs a position signal in accordance with the detected position. The second touch sensor 37 is provided with an open area OP and a closed area CL at upper and lower ends thereof, respectively.

The circuit board 38 has metal domes (metal contacts) 38a, 38b, 38c, and 38d corresponding to the pressing sections 35a, 35b, 35c, and 35d, respectively.

FIG. 3 is a diagram showing the assembled key input section. FIG. 3(a) is a side view of the mobile phone with the second cabinet closed, as seen from a direction of P shown in FIG. 1(a). In this figure, the first cabinet is cut away at the position of the numeric keys so that an internal structure thereof can be illustrated. FIG. 3(b) is a side view of an end of the mobile phone on the numeric key side, as seen from a direction of Q shown in FIG. 1(a). In this figure, the first cabinet is cut away at the position of the second touch sensor so that the internal structure thereof can be illustrated.

The first touch sensor 36 is arranged on the circuit board 38 in such a manner that the metal domes 38d face to the key holes 36a. The second touch sensor 37 is arranged on the circuit board 38 along one end of the circuit board 38. In addition, the keypad 35 integrated with the operation key group 3a is arranged so as to cover the first touch sensor 36 and the second touch sensor 37. In this arrangement, the pressing sections 35d are inserted into the key holes 36a.

When a user presses any of the numeric keys 34, a pressed portion of the keypad 35 is elastically deformed to move the pressing section 35d downward, whereby the pressing section 35d presses the metal dome 38d. Accordingly, it is detected that the numeric key 34 is pressed. This also applies to the main keys 31, the direction key 32, and the confirmation key 33.

In addition, when a user touches by his/her finger the detection area (including the numeric keys 34) of the first touch sensor 36 on the upper surface of the first cabinet 1, the touched position is detected in accordance with a change in capacitance.

The second cabinet 2 has at a lower part of the back surface thereof, a projection 23 that projects toward the first cabinet 1 and touches the upper surface of the first cabinet 1. The projection 23 is formed so as to be positioned just above the second touch sensor 37 in a direction of a Z axis.

FIG. 4 is a diagram for describing a positional relation between the projection and the second touch sensor when the second cabinet is opened and closed. For convenience in description, the second touch sensor can be seen through in the figure.

When the second cabinet 2 is fully closed, the projection 23 is positioned above the closed area CL of the second touch sensor 37, as shown in FIG. 4(a). At that time, the second touch sensor 37 detects that the projection 23 is within the closed area CL. In this state, when the second cabinet 2 is slid, the projection 23 shifts within the detection area of the second touch sensor 37 while being in contact with the upper surface of the first cabinet 1. Then, when the second cabinet 2 is completely slid and fully opened, the projection 23 is positioned above the open area OP of the second touch sensor 37, as shown in FIG. 4(b). At that time, the second touch sensor 37 detects that the projection 23 is within the open area OP.

In such a manner, the second touch sensor 37 can detect whether the projection 23 is within the closed area CL or the open area OP, thereby to determine whether the second cabinet 2 is open or closed.

FIG. 5 is a block diagram showing an entire configuration of the mobile phone. Besides the constitutional elements described above, the mobile phone of this embodiment includes a CPU 100, a camera module 101, an image encoder 102, a microphone 103, a voice encoder 104, a key input circuit 105, a communication module 106, a memory 107, a backlight drive circuit 108, an image decoder 109, a voice decoder 110, and a speaker 111.

The camera module 101 has an imaging element such as a CCD to generate an image signal in accordance with a captured image and output the same to the image encoder 102. The image encoder 102 converts the image signal from the camera module 101 into a digital image signal capable of being processed by the CPU 100, and outputs the same to the CPU 100.

The microphone 103 converts an audio signal into an electric signal, and outputs the same to the voice encoder 104. The voice encoder 104 converts the audio signal from the microphone 103 into a digital audio signal capable of being processed by the CPU 100, and outputs the same to the CPU 100.

The key input section 105 includes the metal domes 38a to 38d. When any key of the operation key group 3a is pressed, the key input circuit 105 outputs an input signal in accordance with the key to the CPU 100.

The communication module 105 converts audio signals, image signals, text signals, and the like from the CPU 100 into radio signals, and transmits the same to a base station via an antenna 106a. In addition, the communication module 105 converts radio signals received via the antenna 106a into audio signals, image signals, text signals, and the like, and outputs the same to the CPU 100.

The memory 107 includes a ROM and a RAM. The memory 107 stores control programs for imparting control functions to the CPU 100. In addition, the memory 107 stores data of images shot by the camera module 101, and image data, text data (mail data), and the like captured externally via the communication module 106, in predetermined file formats.

The liquid crystal display 21 includes a liquid crystal panel 21a and a backlight 21b for supplying light to the liquid crystal panel 21a. The backlight drive circuit 108 supplies a voltage signal to the backlight 21b in accordance with a control signal from the CPU 100. The image decoder 109 converts the image signal from the CPU 100 into an analog image signal capable of being displayed on the liquid crystal panel 21a, and outputs the same to the liquid crystal panel 21a.

The voice decoder 110 converts an audio signal from the CPU 100 into an analog audio signal capable of being output from the speaker 111, and outputs the same to the speaker 111. The speaker 111 reproduces an audio signal from the voice decoder 110 as voice.

The CPU 100 performs communication processing and processes in various function modes by outputting control signals to components such as the communication module 106, the image decoder 109, the voice decoder 110, and the like, in accordance with input signals from components such as the camera module 101, the microphone 103, and the key input circuit 105.

The mobile phone of this embodiment includes several input modes for performing an input operation to the device: a key input mode in which a user can perform an input operation only by the operation key group 3a; and a handwriting input mode in which a user can perform a handwriting input operation within the detection area of the first touch sensor 36.

In addition, when the mobile phone is in the handwriting input mode, an input setting process is carried out depending on opening/closing of the second cabinet 2 so that no incorrect input by the first touch sensor 36 takes place when the second cabinet 2 is opened or closed. This input setting process is constantly repeated while the mobile phone is in operation. The input setting process will be described below in accordance with a flowchart shown in FIG. 6.

When the process is started, the CPU 100 enables input by the second touch sensor 37 (ON state) (S101), and determines whether the projection 23 has shifted (S102). When the position of the projection 23 is changed, the CPU 100 determines that the projection 23 has shifted.

If determining that the projection 23 has shifted (S102: YES), the CPU 100 then determines whether the projection 23 is positioned within the open area OP (S103).

If the second cabinet 2 is fully opened, the projection 23 is positioned within the open area OP as shown in FIG. 4(b), the CPU 100 determines that the projection 23 is positioned within the open area OP (S103: YES), and then enables input by the first touch sensor 36 (ON state) (S104). When input by the first touch sensor 36 is enabled, the CPU 100 accepts a position signal from the first touch sensor 36.

FIG. 7 is a diagram showing one example of a handwriting input operation with the second cabinet fully opened.

As shown in FIG. 7(a), when a user touches and draws a character by his/her finger on the upper surface of the first cabinet 1 within the detection area of the first touch sensor 36, the character is recognized on the basis of a trajectory of drawing, and the recognized character is displayed in a large size in a box on the display screen. After that, the recognized character disappears from the box and then is displayed again on the display screen at a predetermined text input position, as shown in FIG. 7(b).

Returning to FIG. 6, if the second cabinet 2 is not fully opened, the projection 23 is positioned out of the open area OP. Accordingly, if determining at step S103 that the projection 23 is not positioned within the open area OP (S103: NO), the CPU 100 disables input by the first touch sensor 36 (OFF state) (S105). If input by the first touch sensor 36 is originally disabled, the disabled state is maintained. When input by the first touch sensor 36 is disabled, the CPU 100 does not accept a position signal from the first touch sensor 36.

In such a manner as described above, if the second cabinet 2 is slid and positioned above the detection area of the first touch sensor 36, input by the first touch sensor 36 is not enabled. Accordingly, it is possible to prevent that incorrect input by the first touch sensor 36 takes place even if the back surface of the second cabinet 2 is deformed due to manufacturing error or the like and touches partially the upper surface of the first cabinet 1.

As described above, according to this embodiment, it is possible to allow a user to perform handwriting input using the first touch sensor 36, thereby improving user friendliness. In addition, it is possible to prevent that incorrect input to the first touch sensor 36 takes place during sliding of the second cabinet 2, thereby enhancing reliability of an input operation using the first touch sensor 36.

In addition, according to this embodiment, the second cabinet 2 needs only the projection 23 to detect opening/closing of the second cabinet 2. This achieves parts count reduction and cost saving, as compared with the conventional configuration using a magnet and an MR sensor. Further, there is no need to provide space within the second cabinet 2 for arrangement of constitutional elements such as a magnet and an MR sensor, thereby allowing the second cabinet 2 to be made thinner.

Although the embodiment of the present invention is as described above, the present invention is not limited to by this embodiment. Besides, the embodiment of the present invention can be further modified as described below.

Modification Example 1

FIG. 8 is a flowchart of an input setting process in accordance with opening/closing of the second cabinet in a modification example 1.

The modification example 1 is different from the foregoing embodiment, in that an input operation by the numeric keys 34 is enabled instead of a handwriting input operation by the first touch sensor 36 when the projection 23 is positioned out of the open area OP. The input setting process will be described below in detail with reference to FIG. 8. The input setting process is constantly repeated while the mobile phone is in operation, as in the foregoing embodiment.

When the process is started, the CPU 100 enables input by the second touch sensor 37 (S201), and determines whether the projection 23 has shifted (S202). If determining that the projection 23 has shifted (S202: YES), the CPU 100 then determines whether the projection 23 is positioned within the open area OP (S203).

If second cabinet 2 is fully opened and the projection 23 is positioned within the open area OP, the CPU 100 determines that the projection 23 is positioned within the open area OP (S203: YES), and enables input by the first touch sensor 36 and disables input by the numeric keys 34 (OFF state) (S204). Accordingly, handwriting input using the first touch sensor 36 is enabled.

When input by the numeric keys 34 is disabled, the CPU 100 does not accept an input signal from the numeric keys 34.

In contrast, if determining at step S203 that the projection 23 is not positioned within the open area OP (S203: NO), the CPU 100 then determines whether the projection 23 is positioned within the closed area CL (S205). If determining that the projection 23 is not positioned within the closed area CL (S205: NO), the CPU 100 disables input by the first touch sensor 36 and enables input by the numeric keys 34 (ON state) (S206). When input by the numeric keys 34 is enabled, the CPU 100 accepts an input signal from the numeric keys 34.

Accordingly, input by the numeric keys 34 is enabled instead of handwriting input by the first touch sensor 36.

If a user performing handwriting input with the second cabinet 2 fully opened wishes to change to input by the numeric keys 34, for example, the user can close the second cabinet 2 to an extent that the second cabinet 2 does not cover the numeric keys 34, thereby to switch to input by the numeric keys 34. Subsequently, the user can perform input using the numeric keys 34.

When the second cabinet 2 is fully closed, if determining at S205 that the projection 23 is in the closed area CL, the CPU 100 disables input by the first touch sensor 36 and disables input by the numeric keys 34 (S207).

In such a manner as described above, the configuration of the modification example 1 allows a user to readily switch input methods as necessary, thereby improving user friendliness.

In the configuration of the modification example 1, input by the numeric keys 34 is enabled unless the second cabinet 2 is fully closed to coverall the numeric keys 34. Alternatively, the mobile phone may be configured to, if the second touch sensor 37 detects that the second cabinet 2 is positioned so as to cover some of the numeric keys 34, disable input by the numeric keys 34 so that input by the numeric keys 34 is not accepted. In this case, if the second cabinet 2 is excessively closed to cover some of the numeric keys 34, key input is disabled to thereby prompt a user to use the numeric keys 34 in a proper state where all the numeric keys 34 are exposed to the outside.

Modification Example 2

FIG. 9 is a diagram for describing usage modes of the mobile phone in a modification example 2: FIGS. 9(a), 9(b), and 9(c) show the second cabinet 2 that is closed to set a normal mode, a television mode, and a radio mode, respectively; and FIG. 9(d) shows the fully closed second cabinet 2.

The modification example 2 is different from the foregoing embodiment and the modification example 1, in that the individual keys are provided with functions according to the degree of closing of the second cabinet 2, that is, according to a state of external opening of the keys of the operation key group 3a, and that an input operation is enabled on the display screen of the second cabinet 2 even if the second cabinet 2 is fully closed.

As shown in FIG. 9, the second touch sensor 37 includes the opening area OP, the closed area CL, a radio mode determination area M1, a television mode determination area M2, and a normal mode determination mode M3. Accordingly, it is detected by output from the second touch sensor 37 that the projection 23 is positioned within any of the determination areas M1 to M3.

In addition to the configuration of the foregoing embodiment shown in FIG. 5, the mobile phone of the modification example 2 includes a radio module that receives radio broadcasts and performs a predetermined signal process and a television module that receives television broadcasts and performs a predetermined signal process.

FIG. 10 is a flowchart of an input setting process in accordance with opening/closing of the second cabinet in the modification example 2. The input setting process will be described below in detail with reference to FIG. 10. The input setting process is constantly repeated while the mobile phone is in operation, as in the foregoing embodiment.

When the process is started, the CPU 100 enables input by the second touch sensor 37 (S301), and determines whether the projection 23 has shifted (S302). If determining that the projection 23 has shifted (S302: YES), the CPU 100 then determines whether the projection 23 is positioned within the opening area OP (S303).

If second cabinet 2 is fully opened and the projection 23 is positioned within the open area OP, the CPU 100 determines that the projection 23 is positioned within the open area OP (S303: YES), and enables input by the first touch sensor 36 and disables input by the numeric keys 34 (S204). Accordingly, handwriting input using the first touch sensor 36 is enabled.

In contrast, if determining at step S303 that the projection 23 is not positioned within the open area OP (S303: NO), the CPU 100 then determines whether the projection 23 is positioned within the closed area CL (S305). If determining that the projection 23 is not positioned within the closed area CL (S305: NO), the CPU 100 disables input by the first touch sensor 36 (S306).

Next, the CPU 100 determines in which of the determination areas M1 to M3 the projection 23 is positioned, in accordance with output from the second touch sensor 37 (S307).

If determining that the projection 23 is positioned within the radio mode determination area M1 (S307: M1), the CPU 100 then determines that the mobile phone is in the radio mode (S308), and makes key settings for the radio mode (S309). Specifically, as shown in FIG. 9(c), the CPU 100 sets functions required for the radio mode such as "band switching," "tuning," and "volume adjustment," for example, to the six numeric keys in two lower lines that are usable in the radio mode. The CPU 100 disables the keys other than the six numeric keys 34 (OFF state) because these keys are covered with the second cabinet 2 and cannot be used in the radio mode. Then, the CPU 100 enables input by the keys with function settings (ON state) (S314). Accordingly, a user can listen to radio broadcasts by using the six numeric keys 34 exposed to the outside to perform an input operation in the radio mode.

In contrast, if determining at step S307 that the projection 23 is positioned within the television mode determination area M2 (S307: M2), the CPU 100 determines that the mobile phone is in the television mode (S310), and makes key settings for the television mode (S311). Specifically, as shown in FIG. 9(b), the CPU 100 sets functions required for the television mode such as "channel switching," "sound switching," and "volume adjustment," for example, to all the numeric keys 34 that are usable in the television mode. The CPU 100 disables the keys other than the numeric keys 34 because these keys are covered with the second cabinet 2 and cannot be used in the television mode (OFF state). Then, the CPU 100 enables input by the keys with function settings (S314). Accordingly, a user can watch television broadcasts by using all the numeric keys 34 exposed to the outside to perform an input operation in the television mode.

Further, if determining at step S307 that the projection 23 is positioned within the normal mode determination area M3 (S307: M3), the CPU 100 determines that the mobile phone is in the normal mode (S312), and makes key settings for the normal mode (S313). Specifically, as shown in FIG. 9(a), the CPU 100 sets original functions (functions available when the mobile phone is used as a telephone) to all the keys of the operation key group 3a. Then, the CPU 100 enables input by all the keys of the operation key group 3a (S314). Accordingly, a user can perform an input operation by the numeric keys 34 instead of a handwriting input operation, as in the modification example 1.

When the second cabinet 2 is fully closed, the CPU 100 determines at S305 that the projection 23 is in the closed area CL. Then, the CPU 100 disables input by the first touch sensor 36 and disables input by the numeric keys 34 (S315). Further, the CPU 100 assigns software keys 24 to a plurality of areas on the third touch sensor 22, and sets predetermined functions to the individual software keys 24 (S316). Then, the CPU 100 enables input by the third touch sensor 22 (S317). When input by the third touch sensor 22 is enabled, the CPU 100 accepts a position signal from the third touch sensor 22. Accordingly, a user can perform an input operation by the software keys 24 of the third touch sensor 22.

As described above, in the configuration of the modification example 2, the individual keys of the operation key group 3a are set with functions according to the position of the second cabinet 2. Accordingly, even if some keys of the operation key group 3a are hidden by the second cabinet 2, a user can effectively use some of the keys exposed to the outside to perform an input operation in the function mode set according to the number of the keys (the radio mode, the television mode, or the like).

Further, according to the configuration of the modification example 2, it is possible to allow a user to perform an input operation using the third touch sensor 22 even if the second cabinet 2 is fully closed and therefore an input operation by the first touch sensor 36 or the operation key group 3a cannot be performed, thereby further enhancing user friendliness.

<Others>

The embodiment of the present invention can also be modified in various manners other than those described above. For example, the foregoing embodiment has the first touch sensor 36 and the second touch sensor 37 separately arranged. However, the present invention is not limited by this arrangement, and may have the first touch sensor 36 and the second touch sensor 37 integrated with each other. In this case, the present invention may be configured to arrange on one sensor plane a detection area equivalent to the first touch sensor 36 and a detection area equivalent to the second touch sensor 37.

In addition, in the foregoing embodiment, the first touch sensor 36, the second touch sensor 37, and the third touch sensor 22 are all static touch sensors. Alternatively, some or all of these sensors may be touch sensors of another type, for example, pressure-sensitive touch sensors.

Further, in the foregoing embodiment, input by the first touch sensor 36 and the second touch sensor 37 can be accepted by touching the upper surface of the second cabinet 2. However, in some cases, even if the user's finger, the projection 23, or the like is somewhat distant from the upper surface of the second cabinet 2, input may be accepted depending on sensitivity of the first touch sensor 36 and the second touch sensor 37. The first and second touch sensors recited in the claims include a broad range of arrangements in which input can be accepted even if the finger or the like is somewhat distant from the upper surface (detection area) of the second cabinet 2.

Similarly, input by the third touch sensor 22 may be accepted depending on sensitivity, even if the user's finger or the like is somewhat distant from the display screen.

Further, the portable terminal device of the present invention is not limited to mobile phones, and may be personal digital assistants (PDAs) or the like.

Moreover, in the foregoing embodiment, the CPU 100 disables input by the first touch sensor 36 by not accepting a position signal from the first touch sensor 36. However, instead of this method, the first touch sensor 36 may not be allowed to output a positional signal by not stopping the first touch sensor 36.

Specifically, the recitation "disabling input by the first touch sensor" in the claims includes the method for disabling input by not allowing the control section to accept a detection signal from the first touch sensor and the method for disabling input by not allowing the first touch sensor to output a detection signal.

Further, in the configuration of the modification example 1, when the projection 23 is within the open area OP, input by the first touch sensor 36 is enabled and input by the numeric keys 34 is disabled. However, the configuration is not limited by this, and when the projection 23 is within the open area OP, both input by the first touch sensor 36 and input by the numeric keys 34 may be enabled. In this case, when the projection 23 is out of the open area OP, input by the first touch sensor 36 is disabled and input by the numeric keys 34 remains enabled.

Besides, the embodiments of the present invention may be appropriately modified in various manners within the scope of technical ideas recited in the claims.

What is claimed is:

1. A portable terminal device, comprising:
a first case;
a second case that is slidable along one surface of the first case;
a first touch sensor that accepts input to the surface;
a projecting section that projects from the second case toward the surface;
a detecting section that detects a position of the projecting section; and
a control section that controls input by the first touch sensor on the basis of output from the detecting section, wherein
the control section enables input by the first touch sensor when the second case is in a first position where the second case exposes a detection area of the first touch sensor to the outside, and disables input by the first touch sensor when the second case is out of the first position,
the projecting section shifts in contact with the surface together with sliding of the second case, and
the detecting section detects a position of contact of the projecting section with the surface and has a second touch sensor that accepts input by the projecting section to the surface.

2. The portable terminal device according to claim 1, wherein
the surface has a plurality of operation buttons, and
the control section enables input by the operation buttons when the second case is out of the first position.

3. The portable terminal device according to claim 2, wherein
the second case has a display section that outputs an image from one surface of the second case and an input section through which the image can be penetrated,
the detecting section detects that the second case is in a third position where the second case is most distant from the first position, and
the control section enables input by the input section when the second case is in the third position.

4. The portable terminal device according to claim 2, wherein
the detecting section detects that the second case is out of the first position and is in a second position where the second case covers some of the plurality of operation buttons, and
when the second case is in the second position, the control section sets the operation buttons with functions corresponding to the second position.

5. The portable terminal device according to claim 4, wherein
the second case has a display section that outputs an image from one surface of the second case and an input section through which the image can be penetrated,
the detecting section detects that the second case is in a third position where the second case is most distant from the first position, and the control section enables input by the input section when the second case is in the third position.

6. A method of controlling a portable terminal device, the portable terminal device comprising a first case; a second case that is slidable along one surface of the first case; a first touch sensor that accepts input to the surface; a projecting section that projects from the second case toward the surface; and a detecting section that detects a position of the projecting section, wherein the projecting section shifts in contact with the surface together with sliding of the second case; and the detecting section detects a position of contact of the projecting section with the surface and has a second touch sensor that accepts input by the projecting section to the surface, the method of controlling the portable terminal device including steps of: enabling input by the first touch sensor when the second case is in a first position where the second case exposes a detection area of the first touch sensor to the outside; and disenabling input by the first touch sensor when the second case is out of the first position.

* * * * *